E. DISINGER.
MACHINE FOR CASTING STRAPS TO BATTERY PLATES.
APPLICATION FILED JAN. 14, 1914. RENEWED NOV. 7, 1917.

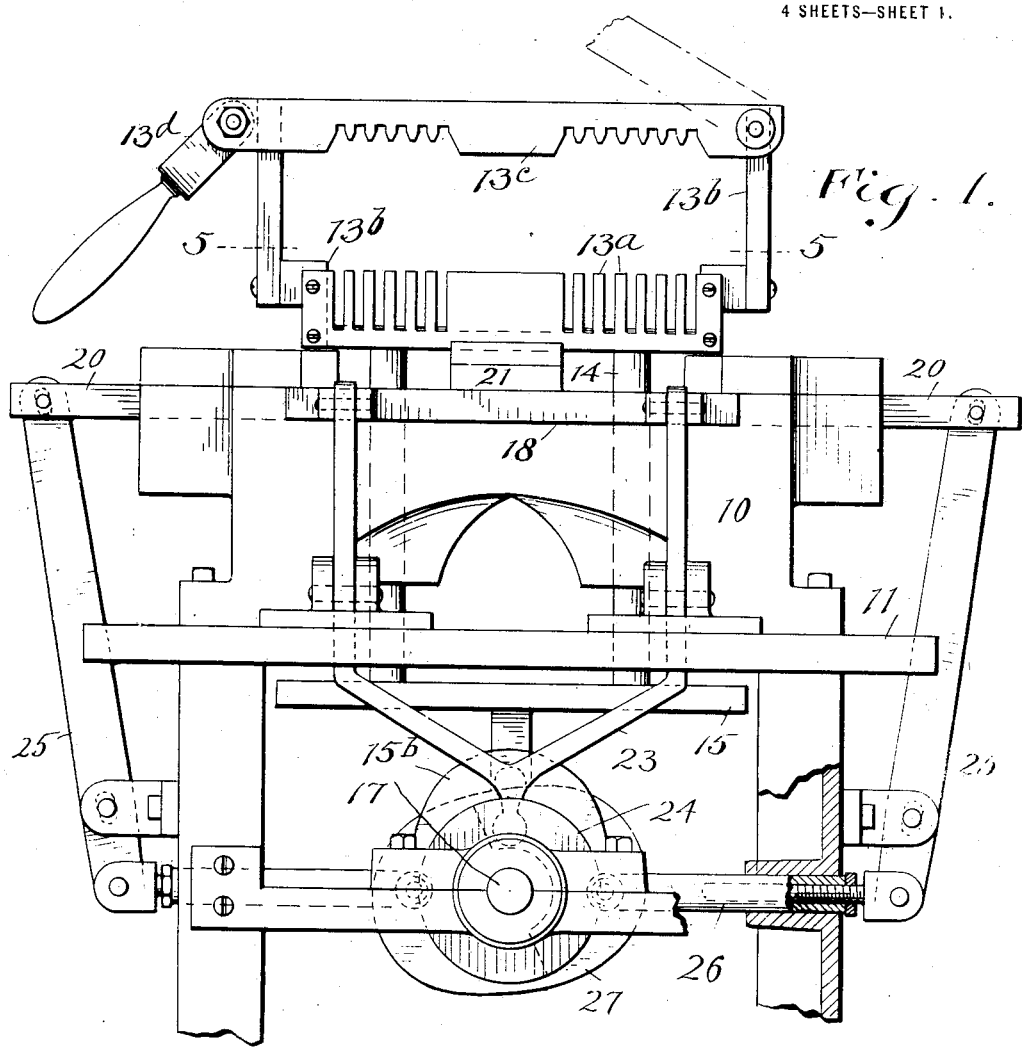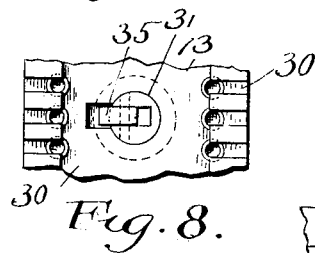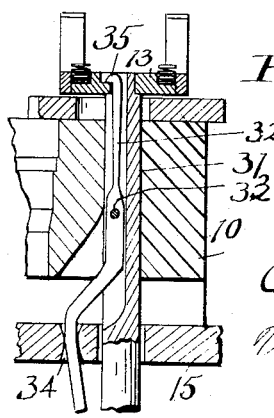

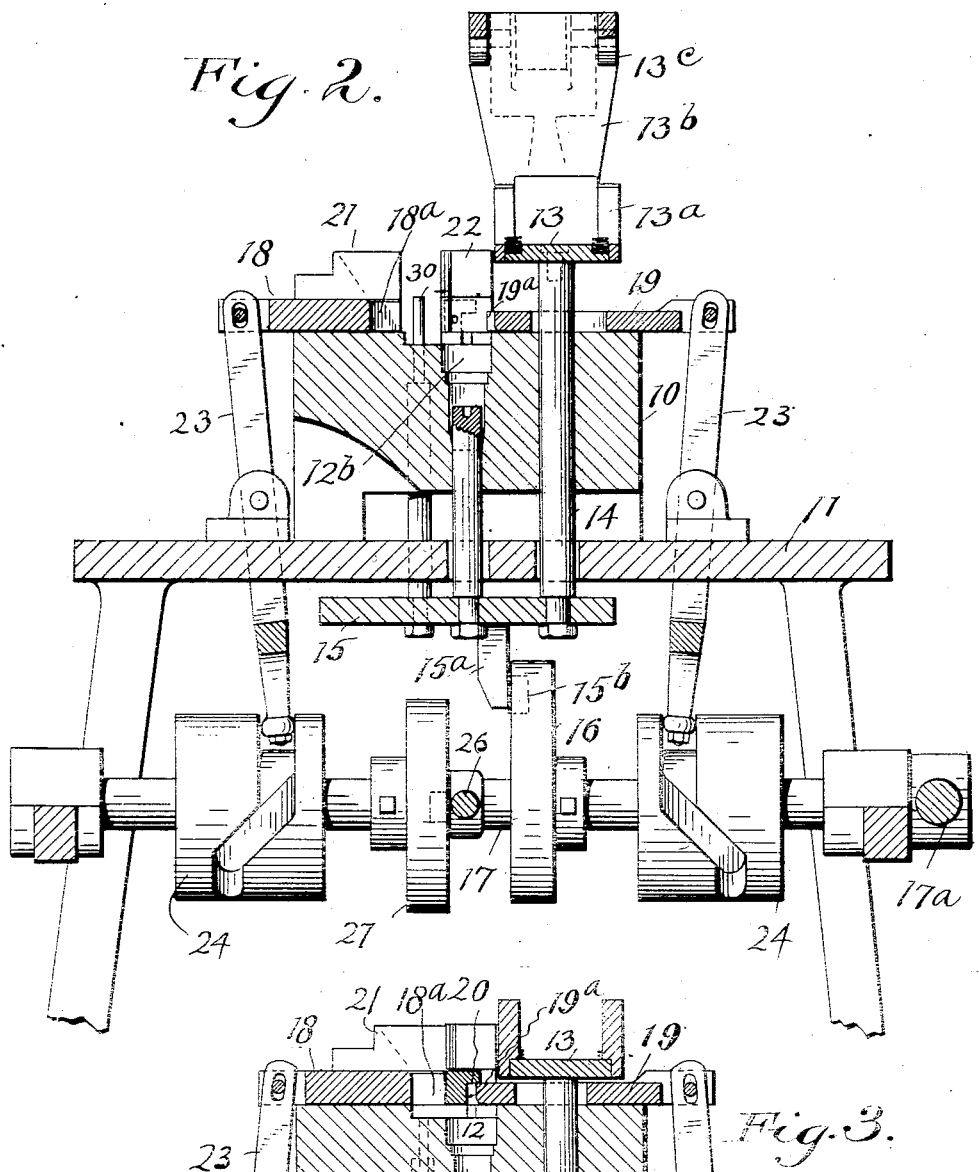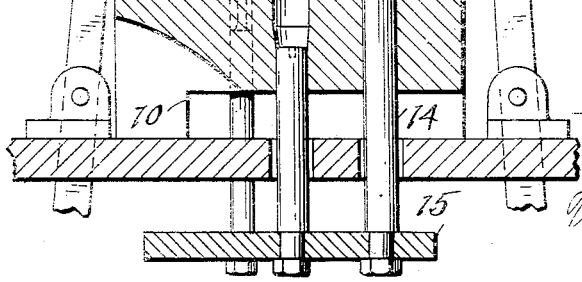

1,274,016.

Patented July 30, 1918.
4 SHEETS—SHEET 3.

Witnesses
E. B. Gilchrist
L. I. Porter

Inventor
Ernest Disinger
by Thurston & Kurz
Attys.

E. DISINGER.
MACHINE FOR CASTING STRAPS TO BATTERY PLATES.
APPLICATION FILED JAN. 14, 1914. RENEWED NOV. 7, 1917.

1,274,016.

Patented July 30, 1918.
4 SHEETS—SHEET 4.

Witnesses
E. B. Gilchrist
L. I. Porter

Inventor
Ernest Disinger
by Thurston & Kurs
Attys

UNITED STATES PATENT OFFICE.

ERNEST DISINGER, OF CLEVELAND, OHIO, ASSIGNOR TO WILLARD STORAGE BATTERY COMPANY, OF CLEVELAND, OHIO, A CORPORATION OF WEST VIRGINIA.

MACHINE FOR CASTING STRAPS TO BATTERY-PLATES.

1,274,016.  Specification of Letters Patent.  Patented July 30, 1918.

Application filed January 14, 1914, Serial No. 812,033. Renewed November 7, 1917. Serial No. 200,844.

*To all whom it may concern:*

Be it known that I, ERNEST DISINGER, a citizen of the United States, residing at Cleveland, in the county of Cuyahoga and State of Ohio, have invented a certain new and useful Improvement in Machines for Casting Straps to Battery-Plates, of which the following is a full, clear, and exact description.

This invention relates to a machine for casting so-called straps to groups of storage battery plates, and has for its chief object to provide a machine wherein a group of battery plates can be quickly and effectively connected by casting a connecting strap to lugs or terminals of the plates.

Further, the invention aims to provide a casting machine composed of parts so arranged and operated that the straps, terminal posts and other desired projections will be cast onto the plates, and wherein the plates are properly supported, alined and shifted into and out of the mold.

The above and other objects are attained by my invention, which may be briefly summarized as consisting in certain novel details of construction and combinations and arrangements of parts which will be described in the specification and set forth in the appended claims.

Figure 4:
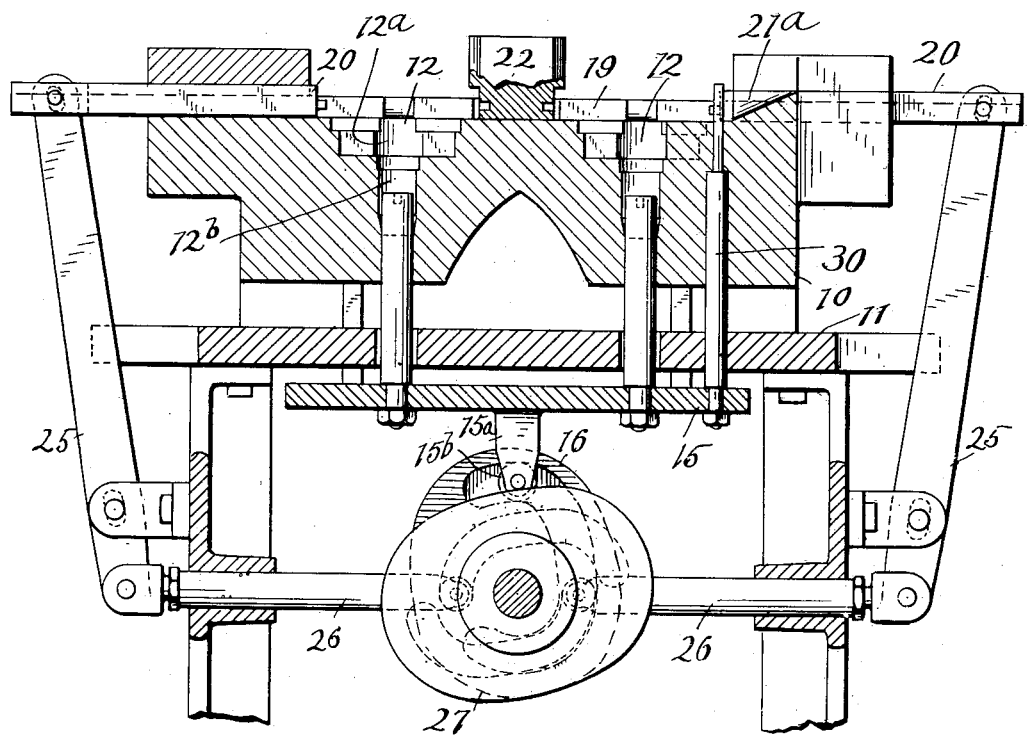
Figure 6:
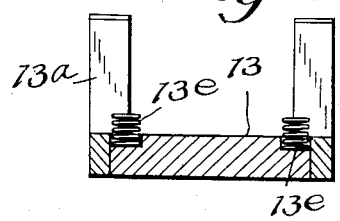
Figure 5:
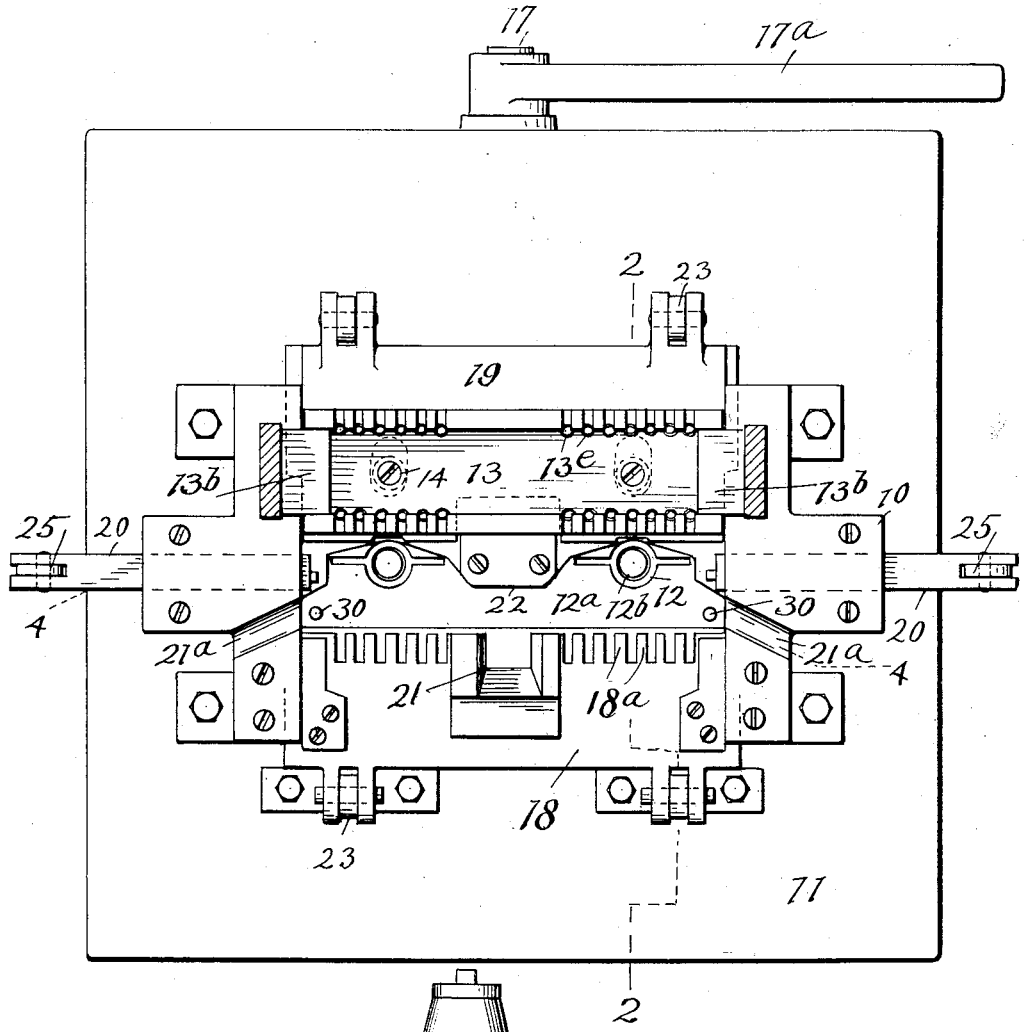
Figure 9:
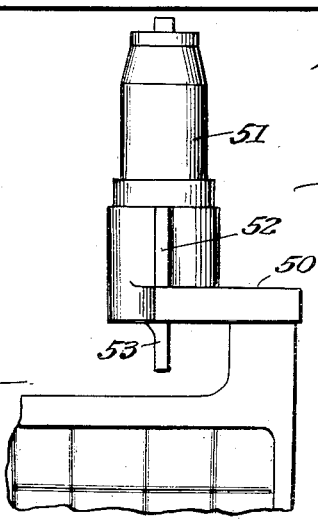

In the drawings, wherein I have shown the preferred form of my invention, Figure 1 is a side view of the machine; Fig. 2 is a transverse section through the same along the line 2—2 of Fig. 5, with the mold open; Fig. 3 is a similar view of a portion of the machine with the mold closed and the magazine lowered; Fig. 4 is a sectional view taken through the machine at right angles to the section in Fig. 2, the magazine being omitted; Fig. 5 is a top plan view with the magazine removed; Fig. 6 is an enlarged transverse sectional view through the magazine; Fig. 7 is a transverse sectional view through the magazine and portion of the mold showing a modification; and Fig. 8 is a detail plan view of the same; Fig. 9 is a view showing the finished product produced by the casting machine.

The machine includes a mold which is provided with a fixed base or main lower portion 10, preferably in the form of a heavy casting which is supported on a horizontal table 11. In the present case, straps are adapted to be cast simultaneously on two sets of battery plates, namely, both the positive and the negative plates of one battery. However, the action or manner of operation with both sets is precisely the same.

The mold base 10 is therefore provided at the top thereof and on opposite sides of the transverse center plane with casting recesses or molds proper 12, which are adapted to receive from above, the lower ends of the plate terminals or lugs and are shaped in accordance with the shape of the part or parts to be cast onto the plates. In the present case, each mold cavity when closed by the movable top members, includes a part $12^a$ which forms the strap, and a cylindrical shaped recess $12^b$ which extends downwardly into the mold base and forms the terminal post for the group of plates, which post is, of course, integral with the strap. The cavity for the post has laterally extending wings by which lateral wings are cast onto the post, and, as will later appear, a lip or flange is also cast onto the side of the strap opposite the terminal post.

The construction to which reference has just been made is shown in Fig. 9. In this figure the strap proper is indicated at 50, the body of the terminal member at 51, the wings extending from the body portion at 52, and the lip or flange extending from the strap at 53. Comparing the structure of the finished product with the mold for the same, as shown in Fig. 4, the purpose of the various recesses of the mold will be apparent.

The two groups of battery plates to which the straps are to be cast are supported in a rectangular shaped movable magazine in the form of a frame or rack which is above the mold. This rack includes a bottom member 13 provided with two separated groups of upstanding fingers $13^a$ forming slots in which the battery plates are adapted to be inserted so as to stand vertically with the usual battery plate lugs arranged on one side of the rack and extending downwardly directly above the mold cavity $12^a$. The rack also includes two upright end members 13$^b$ and a swinging top member or bar 13$^c$ which is pivoted to one end member 13$^b$ and is adapted to swing upwardly from or down to the other end member, and to be clamped thereto by a swinging locking member 13$^d$. The top of the rack is provided with downwardly extending fingers or teeth which are adapted to extend between the plates when the latter are in the rack. The teeth on the upper and lower members of the rack hold the plates just the desired distance apart, and when the upper member is swung downwardly and locked, the plates are firmly clamped and are alined along what are then the top edges (but which are, in fact, the bottom edges) of the plates for the reason that I provide on the lower member of the rack in line with each of the slots a pair of rather stiff springs 13$^e$, onto which the plates are placed, and down onto which the plates are firmly pressed by the upper member of the rack. This brings the lower edges of the plates which engage the upper bar of the rack in alinement, as is desirable in order that the plates will bear evenly on the ribs at the bottom of a battery container.

The rack which is adapted to be raised and lowered is supported on the upper ends of two vertical rods 14 which pass freely through the mold base 10 at one side of the mold cavities, and through the table 11. At the lower ends of the rods 14 is secured a horizontal plate 15 to which is secured a member 15$^a$ provided with a roller 15$^b$, which engages in the cam groove of a cam 16 fixed to a main operating rock shaft 17, which is beneath the table, and is provided at one end with an operating crank or handle 17$^a$, adapted to be grasped and turned by the operator to cause the lowering or raising of the rack and the closing and opening of the mold, as will be subsequently explained.

The upper part of the mold is formed by, and the mold cavities are closed by, several members which are adapted to be moved inwardly and outwardly or toward and from each other. More specifically, these members consist of a front sliding plate 18, and a rear sliding plate 19, which move on the top of the mold base 10 from the front and rear sides, and two endwise movable core members 20 which likewise move over the top of the mold base 10 in an endwise direction.

The plate 18 is provided on its forward edge with teeth or fingers 18$^a$ which when the plate is moved inwardly pass between the lugs on the battery plates, and so not only serve to close or cover a portion of the mold cavity, but assist in steadying the plates, and also serve to bring the lugs which extend down into the mold cavity into exact alinement. This plate has at the center a so-called gate or pouring spout or inlet port 21, which when the plate is moved inward to its normal position, bears against a center stop member 22 which is between the two groups of battery plates when supported in the rack. At the ends of the molds are so-called "risers" or overflow spouts 21$^a$.

Each of the endwise movable core members 20 moves inwardly toward the center member 22 and along the ends of the teeth of the plate 18, and bear against the end of the teeth and against the edges of the lugs of the battery plates. These members 20 extend between the two plates 18 and 19, as shown most clearly in Fig. 5, and are provided with flanges which overlap somewhat the edge of the plate 19. Beneath this flange and between the adjacent edges of the plate 19 and core members 20 are cavities which form parts of the mold, and the metal which rises into these openings forms lips or flanges on the lower sides of the straps. The plates 18 and 19 are moved inwardly and outwardly by mechanism, including levers 23, which are pivoted between their ends on the bed 11, and at their upper ends are pivoted to the plates 18 and 19 respectively, and at their lower ends have rollers which engage in slots of cams 24 secured to the rock shaft 17. The core members 20 are moved inwardly and outwardly by somewhat similar mechanism which includes levers 25 which are pivoted between their ends and which at their upper ends are pivotally connected to the members 20, and at their lower ends are provided with inwardly extending arms 26 having rollers which engage in separate cam grooves of a cam 27 secured to the rock shaft.

The casting machine is operated in the following manner. Two sets of plates are placed in the rack or magazine, after which the top member of the magazine is brought down into position so as to clamp the plates into the magazine. Thence the rock shaft is turned by the operator, and this turning movement first lowers the magazine with the plates, carrying the lugs of the two groups of plates into the mold cavities. During the same movement of the rock shaft, and after the magazine has been lowered, the mold is closed by the inward movement of the plates 18 and 19, and core members 20. These members close the mold and aline the lugs of the plate. By the inward movement of the plate 18, the plate is brought up against the member 22, and the metal is then ready to be poured. The metal is poured into the gate and fills the mold cavities, casting onto each group of battery plates, a strap which unites the plates, also the terminal post and the lips previously referred to. As soon as the metal has been poured and hardened, the operator turns the rock shaft in the reverse direction, and this opens the mold by moving outwardly the plates 18, 19 and core members 20, and raises the magazine and plates from the mold.

Preferably, the cavities which extend down into the mold to form the terminal posts pass entirely through the mold base, and the plate 15 is provided with rods which extend up into the openings, so as to form closures therefor. Consequently, after the metal has been poured, and it is desired to remove the plates with the parts cast thereto, these rods assist in lifting the composite structure and minimize the liability of the more or less soft metal being distorted.

Additionally, I may employ other lifting members 30 which can be secured to the plate 15 and extended up through the mold base 10 so as to engage and assist in lifting the parts after the casting is done.

With this machine, battery plates can be very quickly and very effectively electrically connected by having a strap and also the other parts, including the terminal post cast thereto. At the same time, the plates are properly alined, so that they can be firmly and properly seated in the base of a battery container.

In Figs. 1, 2 and 3, the plate magazine is shown as permanently attached to the upper ends of the vertical rods or plungers 14. They may, however, if desired, be removably attached to the upper ends of these rods, so as to do away with the necessity of the operator placing the plates in the magazine on the machine.

In Figs. 7 and 8 is shown one way in which this may be accomplished. The magazine here designated 30 is adapted to be placed down onto the upper ends of two plungers here designated 31, the magazine having holes provided in its base of a size sufficiently large to receive the upper ends of the plungers, and the latter having shoulders a short distance from their upper ends so as to firmly support the magazine. Each of the plungers 31 is in this instance provided with an automatic locking dog 32 which extends lengthwise of the plunger, and is seated in a slot provided therein, the dog being pivoted between its ends to the plunger at 33. The lower end of the dog projects laterally from the plunger and extends through an opening 34 in the bed-plate, and is so shaped that when the plunger is lowered, the dog is rocked; that is, the upper end 35 of the dog is moved to the left, as shown in Fig. 7, so as to cause it to be moved into locking engagement with a suitable locking lip provided on the base of the magazine. The dogs will then securely lock the magazine in place, while it is in lowered position. When the plungers and magazines are elevated, the dogs are automatically rocked out of locking engagement with the magazine, so that the magazine can be lifted from the plungers. This construction will avoid some loss of time in the use of the machine, for the reason that if two or more magazines are provided, one magazine can be loaded, while the other is in use on the machine, so that as soon as a strap has been cast onto the plates which are in one magazine, the operator has simply to replace that magazine with the other magazine which has been previously loaded.

Having thus described my invention, what I claim is:

1. In a machine for casting straps to groups of battery plates, a mold comprising a base having a cavity in which metal is to be poured, means for supporting a plurality of battery plates in spaced relationship and so that portions of the plates will extend into the cavity, means for closing the mold comprising a plurality of members movable toward and from each other, one of the members being provided with teeth which extend between the portions of the battery plates extending into the cavity.

2. In a machine for casting straps to groups of battery plates, a mold comprising a base having a cavity in which metal is to be poured, means for supporting a plurality of battery plates in spaced relationship and so that portions of the plates will extend into the cavity, means for closing the mold comprising a pair of members movable toward and from each other, and an endwise movable member movable between said pair of members.

3. In a machine for casting straps to groups of battery plates, a mold comprising a base having a cavity in which metal is adapted to be poured, a magazine for a group of battery plates adapted to be moved toward and from the mold cavity, means for closing the mold comprising a plurality of members movable toward and from each other, and means operable from a single point for shifting the magazine and for operating the mold closing means.

4. In a machine for casting straps to groups of battery plates, a mold having a cavity in which metal is adapted to be poured, a holder adapted to receive a group of plates so that portions thereof may be extended into the cavity, said magazine having yieldable means engaged by the plates along one edge and a clamp for holding the plates against said yieldable means.

5. In a machine for casting straps to groups of battery plates, a mold having a cavity in which metal is adapted to be poured and adapted to receive portions of the plates to which the strap is to be cast, a holder for supporting the plates in spaced relationship and in alinement, said holder having along its base, yieldable plate engaging means and having at the top a movable plate clamping member.

In testimony whereof, I hereunto affix my signature in the presence of two witnesses.

ERNEST DISINGER.

Witnesses:
L. I. PORTER,
A. F. KWIS.